(12) United States Patent
Kamaga

(10) Patent No.: US 8,810,060 B2
(45) Date of Patent: Aug. 19, 2014

(54) CHARGING DEVICE FOR VEHICLE

(75) Inventor: Ryuichi Kamaga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 188 days.

(21) Appl. No.: 12/740,791

(22) PCT Filed: Dec. 19, 2008

(86) PCT No.: PCT/JP2008/073168
§ 371 (c)(1),
(2), (4) Date: Apr. 30, 2010

(87) PCT Pub. No.: WO2009/090832
PCT Pub. Date: Jul. 23, 2009

(65) Prior Publication Data
US 2010/0270860 A1   Oct. 28, 2010

(30) Foreign Application Priority Data

Jan. 15, 2008  (JP) ................................ 2008-005893

(51) Int. Cl.
| | | |
|---|---|---|
| *B60R 16/03* | (2006.01) | |
| *B60W 10/26* | (2006.01) | |
| *B60K 6/365* | (2007.10) | |
| *B60K 6/445* | (2007.10) | |
| *B60L 1/14* | (2006.01) | |
| *B60L 11/12* | (2006.01) | |
| *B60L 11/14* | (2006.01) | |
| *B60L 11/18* | (2006.01) | |
| *B60L 15/00* | (2006.01) | |
| *B60K 1/02* | (2006.01) | |
| *B60W 20/00* | (2006.01) | |

(52) U.S. Cl.
CPC ................ *B60W 10/26* (2013.01); *Y02T 10/20* (2013.01); *B60R 16/03* (2013.01); *B60K 1/02* (2013.01); *B60K 6/365* (2013.01); *B60K 6/445* (2013.01); *B60L 1/14* (2013.01); *B60L 11/123* (2013.01); *B60L 11/14* (2013.01); *B60L 11/1812* (2013.01); *B60L 11/1814* (2013.01); *B60L 11/1818* (2013.01); *B60L 15/007* (2013.01); *B60L 2220/14* (2013.01); *B60L 2220/54* (2013.01); *B60L 2240/80* (2013.01); *B60W 20/00* (2013.01); *Y02T 10/6217* (2013.01); *Y02T 10/6239* (2013.01); *Y02T 10/6269* (2013.01); *Y02T 10/641* (2013.01); *Y02T 10/7005* (2013.01); *Y02T 10/7077* (2013.01); *Y02T 10/7088* (2013.01); *Y02T 90/121* (2013.01); *Y02T 90/127* (2013.01); *Y02T 90/14* (2013.01)
USPC .......................................... 307/9.1; 307/10.1

(58) Field of Classification Search
CPC ................................ B60R 16/03; Y02T 10/20
USPC ..................................................... 307/9.1, 10.1
See application file for complete search history.

(56) References Cited

U.S. PATENT DOCUMENTS

| | | | | |
|---|---|---|---|---|
| 3,898,547 | A * | 8/1975 | Poole | 320/109 |
| 4,994,726 | A * | 2/1991 | Tamura et al. | 320/107 |
| 5,291,118 | A * | 3/1994 | Kojima | 320/150 |
| 5,344,331 | A * | 9/1994 | Hoffman et al. | 439/138 |
| 5,433,623 | A * | 7/1995 | Wakata et al. | 439/310 |
| 5,614,808 | A * | 3/1997 | Konoya et al. | 320/109 |
| 5,637,977 | A * | 6/1997 | Saito et al. | 320/109 |
| 5,646,500 | A | 7/1997 | Wilson | |
| 5,686,812 | A * | 11/1997 | Hotta | 320/134 |
| 5,984,706 | A * | 11/1999 | Kakuta et al. | 439/310 |
| 6,373,221 | B1 * | 4/2002 | Koike et al. | 320/108 |
| 7,253,584 | B2 * | 8/2007 | Souther et al. | 320/104 |
| 7,439,851 | B2 * | 10/2008 | Fleury et al. | 340/438 |
| 7,595,607 | B2 * | 9/2009 | Lambert et al. | 320/106 |
| 7,698,078 | B2 * | 4/2010 | Kelty et al. | 702/63 |
| 7,984,852 | B2 * | 7/2011 | Outwater | 235/381 |
| 8,000,858 | B2 * | 8/2011 | Tonegawa et al. | 701/36 |
| 8,063,757 | B2 * | 11/2011 | Frey et al. | 340/455 |
| 8,091,663 | B2 * | 1/2012 | Ichikawa | 180/65.265 |
| 8,183,826 | B2 * | 5/2012 | Tuffner et al. | 320/107 |
| 8,368,350 | B2 * | 2/2013 | Iwanaga et al. | 320/109 |
| 2004/0130288 | A1 * | 7/2004 | Souther et al. | 320/104 |
| 2008/0180058 | A1 * | 7/2008 | Patel et al. | 320/109 |

| | | | | |
|---|---|---|---|---|
| 2009/0021385 A1* | 1/2009 | Kelty et al. | | 340/660 |
| 2010/0045450 A1* | 2/2010 | Suzuki et al. | | 340/438 |
| 2010/0161482 A1* | 6/2010 | Littrell | | 705/40 |
| 2010/0289451 A1* | 11/2010 | Tuffner et al. | | 320/109 |
| 2011/0127956 A1* | 6/2011 | Mitsutani | | 320/109 |
| 2011/0291612 A1* | 12/2011 | Fujitake | | 320/107 |
| 2012/0098488 A1* | 4/2012 | Ichikawa | | 320/109 |
| 2012/0133204 A1* | 5/2012 | Ang et al. | | 307/10.1 |

FOREIGN PATENT DOCUMENTS

| | | | | |
|---|---|---|---|---|
| CN | 1368776 A | | 9/2002 | |
| EP | 0 573 065 A2 | | 12/1993 | |
| EP | 2 197 084 A1 | | 6/2010 | |
| EP | 2204894 A1 | * | 7/2010 | ............ H01M 10/44 |
| JP | 05276676 A | * | 10/1993 | ................ H02J 7/00 |
| JP | A-5-308732 | | 11/1993 | |
| JP | U-6-2948 | | 1/1994 | |
| JP | 06343204 A | * | 12/1994 | .............. B60L 11/18 |
| JP | A-7-46711 | | 2/1995 | |
| JP | A-7-123519 | | 5/1995 | |
| JP | A-11-18306 | | 1/1999 | |
| JP | A-2000-50511 | | 2/2000 | |
| JP | A-2002-354683 | | 12/2002 | |
| JP | A-2007-228695 | | 9/2007 | |
| JP | A-2007-228716 | | 9/2007 | |
| WO | WO-2009035069 A1 | | 3/2009 | |

OTHER PUBLICATIONS

International Search Report in International Patent Application No. PCT/JP2008/073168, mailed on Mar. 10, 2009 (with English translation).

Jul. 13, 2012 Office Action issued in Chinese Patent Application No. 200880124848.8.

* cited by examiner

Primary Examiner — Adi Amrany
(74) Attorney, Agent, or Firm — Oliff PLC

(57) ABSTRACT

A charging device for a vehicle includes a connector configured such that a coupler for transmitting electric power from an external power supply to the vehicle is connectable to the connector, a charging circuit for transmitting electric power from the connector to a power storage device, a charging control unit for charging the power storage device by controlling the charging circuit while in an operating state, and for halting control of the charging circuit while in a halting state, and an activation control unit for keeping the charging control unit in the halting state until detecting that the connector receives electric power, in a case where connection of the coupler and the connector is detected, and for switching the charging control unit from the halting state to the operating state when it is detected that the connector receives electric power.

3 Claims, 11 Drawing Sheets

CHARGING DEVICE FOR VEHICLE

TECHNICAL FIELD

The present invention relates to a charging device for a vehicle that is configured to be capable of charging a power storage device used for driving the vehicle, with electric power from a power supply outside the vehicle.

BACKGROUND ART

An electric-powered vehicle is mounted with a power storage device (such as secondary battery or capacitor for example) and travels by using driving force generated from electric power stored in the power storage device. The electric-powered vehicle includes, for example, electric vehicle, hybrid vehicle, fuel-cell vehicle and the like.

In recent years, a technique has been proposed for charging a power storage device mounted on such vehicles as described above by a commercial power supply having a high power generation efficiency. With this technique, increase in fuel consumption efficiency of the hybrid vehicle for example can be expected. In particular, attention is being given to a technique for charging a power storage device mounted on an electric-powered vehicle by a commercial power supply (a source of a relatively low voltage such as 100 V or 200 V, for example) providing electric power to each household. In the following, a vehicle having a power storage device such as battery mounted on the vehicle and chargeable by means of a power supply outside the vehicle is also referred to as "plug-in vehicle".

In the vehicle of the above-described type, generally the power storage device is charged by connecting a charge cable to a connector provided to the vehicle. Regarding a technique for charging a power storage device mounted on a vehicle by means of an external power supply, Japanese Patent Laying-Open No. 7-123519 (Patent Document 1) for example discloses a charging control device that is activated immediately after a charger is connected to the device, and turns on a relay so that a conductive line used for charging is set into a chargeable state.

Patent Document 1: Japanese Patent Laying-Open No. 7-123519
Patent Document 2: Japanese Patent Laying-Open No. 7-46711
Patent Document 3: Japanese Patent Laying-Open No. 5-308732
Patent Document 4: Japanese Utility Model Laying-Open No. 6-2948

DISCLOSURE OF THE INVENTION

Problems to be Solved by the Invention

In the case for example where a power storage device mounted on a vehicle is charged with electric power from a commercial power supply, a charge cable is configured to be connectable to a household power supply outlet and a vehicle. Therefore, when the power storage device is to be charged, a user has to connect the charge cable to both of the power supply outlet and the vehicle. It may occur, however, the user connects the charge cable to the vehicle while forgetting about connecting the charge cable to the power supply outlet.

In this case, it is highly possible that the user assumes that the power storage device starts being charged at the time the user connects the charge cable to the vehicle. It is thus expected that a some long time will elapse while the charge cable remains unconnected to the power supply outlet.

The charging control device disclosed in Japanese Patent Laying-Open No. 7-123519 is activated immediately after the charger is connected to the device. The charging control device, however, will continue operating after activated once, even if the vehicle is not supplied with electric power from the power supply outside the vehicle. A possible resultant problem in this case is that electric power (electric power stored in an auxiliary battery for example) for allowing the charging control device to continue operating is uselessly consumed.

The present invention has been made in order to solve this problem, and an object of the invention is to provide a charging device for an electric-powered vehicle mounted with a power storage device chargeable by an external power supply, with which electric energy consumed for charging control can be reduced.

Means for Solving the Problems

In summary, the present invention is a charging device for a vehicle, configured to be capable of charging by a power supply outside the vehicle a power storage device mounted on the vehicle for driving the vehicle. The vehicle is connectable to the power supply by a coupler capable of transmitting electric power from the power supply to the vehicle. The charging device includes: a connector provided to the vehicle and configured such that the coupler is connectable to the connector; a power feeding unit mounted on the vehicle for transmitting the electric power from the connector to the power storage device; a charging control unit mounted on the vehicle for charging the power storage device by controlling the power feeding unit while the charging control unit is in an operating state, and for halting control of the power feeding unit while the charging control unit is in a halting state; and an activation control unit for keeping the charging control unit in the halting state until it is detected that the connector receives the electric power in a case where connection of the coupler and the connector is detected, and for switching the charging control unit from the halting state to the operating state when it is detected that the connector receives the electric power.

Preferably, the charging device further includes an informing unit, a signal transmission unit and a signal selection unit. The informing unit is mounted on the vehicle for giving information that the connector and the coupler are connected and information that the electric power is input to the connector, by operating in a first pattern in accordance with a first signal indicating connection of the coupler to the connector and by operating in a second pattern in accordance with a second signal indicating reception of the electric power by the connector. The signal transmission unit transmits the first signal while the coupler is connected to the connector. The signal selection unit is configured to be capable of receiving the first signal and the second signal for outputting, while the signal selection unit receives the second signal, the second signal as received to the informing unit regardless of whether the signal selection unit receives the first signal, and for outputting, while the signal selection unit receives the first signal and does not receive the second signal, the first signal to the informing unit. The activation control unit transmits the second signal while the charging control unit is in the operating state.

More preferably, when input of the electric power to the connector is detected before a predetermined first time has elapsed from the time when connection of the coupler and the connector is detected, the activation control unit waits to output of the second signal until a predetermined second time has elapsed from the time when input of the electric power to the connector is detected.

More preferably, the activation control unit halts transmission of the second signal when charging of the power storage device by the charging control unit is completed.

More preferably, the informing unit includes a lamp, and a drive circuit for driving the lamp in accordance with the first and second signals. The first pattern is a lighting pattern for the drive circuit to intermittently light up the lamp. The second pattern is a lighting pattern for the drive circuit to continuously light up the lamp.

Still more preferably, the coupler transmits electric power information indicating the electric power to the connector when the coupler and the power supply are connected. The activation control unit detects that the connector receives the electric power by receiving the electric power information via the connector.

Effects of the Invention

According to the present invention, consumption of electric energy used for charging control for an electric-powered vehicle can be reduced.

Figure 1:
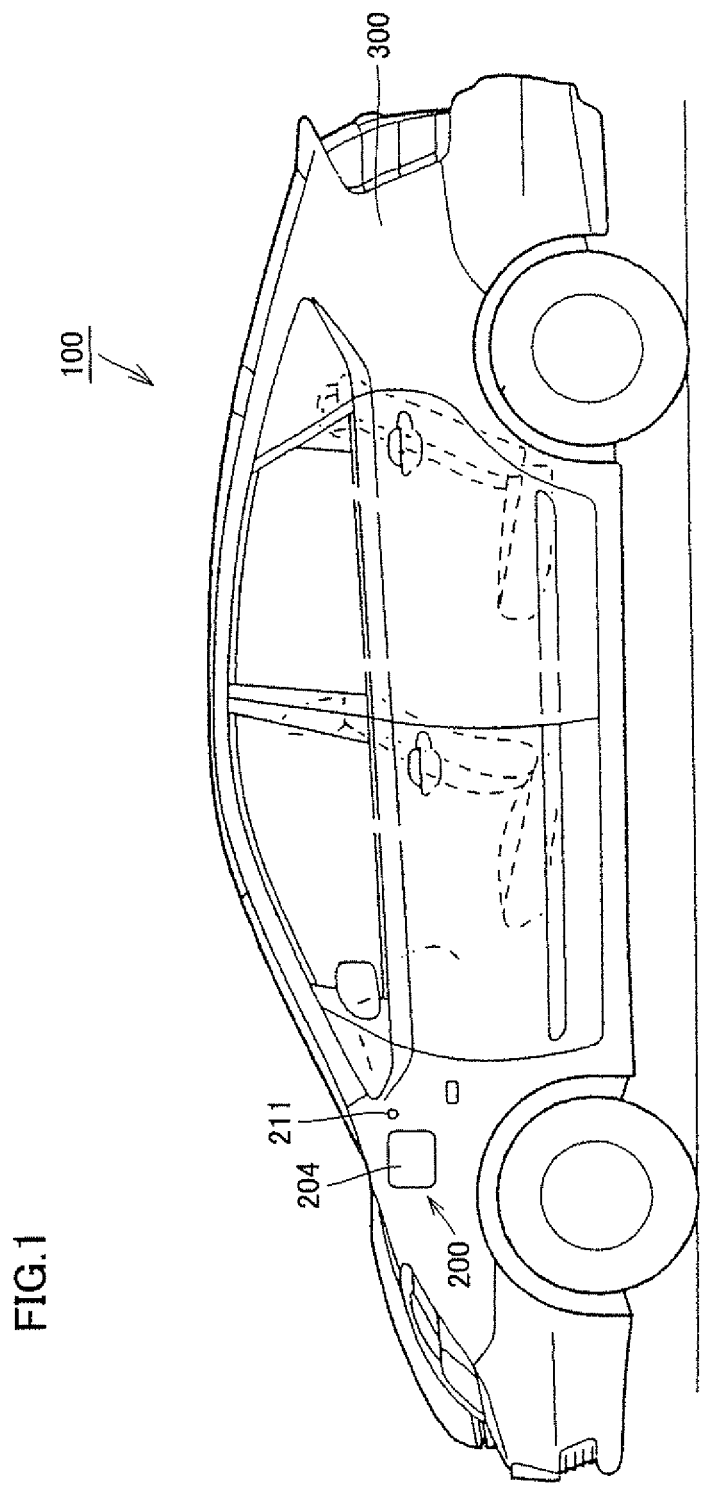
FIG. 1 is a side view of a vehicle 100 according to an embodiment of the present invention.

DESCRIPTION OF THE REFERENCE SIGNS 2 electric power control unit, 3 activation control unit, 4 power storage device, 6 converter, 8-1, 8-2 inverter, 10, 14 current sensor, 12, 15-17, 604 voltage sensor, 20 DC/DC converter, 21 connection unit, 21-1, 21-2, 332 relay, 22 power split device, 24 drive wheel, 25 connector, 30 charging circuit, 40 lighting circuit, 41 flashing circuit, 42 OR circuit, 43 lamp drive circuit, 44, 61 switch, 100, 100A, 100E vehicle, 200 charge inlet, 204 lid, 206 support, 208 housing, 210 AC port, 211 lamp, 240 external power supply, 241 power supply outlet, 250, 250A, 250B coupler, 260 plug, 261 connector, 262 CCID, 263 control box, 264 voltage converter, 300 vehicle body, 334 control pilot circuit, 602 oscillator, 606 electromagnetic coil, 608 electrical leakage detector, ACLp, ACLn, Lp, Ln, DCL, PL1, NL1, PL2, NL2 electric power line, ARM1$n$, ARM2$n$ lower arm, ARM1$p$, ARM2$p$ upper arm, C capacitor, D free-wheeling diode, 18 internal combustion engine, L1 control pilot line, L2 signal line, L3 ground line, MG1, MG2 motor generator, MNL main negative line, MPL main positive line, N1, N2 neutral point, R1 resistor, SB auxiliary battery, T1, T2 terminal, TR switching element

BEST MODES FOR CARRYING OUT THE INVENTION

In the following, embodiments of the present invention will be described in detail with reference to the drawings. In the drawings, like or corresponding components are denoted by like reference characters, and a description thereof will not be repeated.

In the embodiments of the present invention, a plug-in hybrid vehicle is exemplified as an electric-powered vehicle chargeable by an external power supply (hereinafter referred to as "hybrid vehicle"). The electric-powered vehicle chargeable by an external power supply, however, is not limited to the hybrid vehicle, and may be an electric vehicle or fuel-cell vehicle, for example. The present invention is applicable to a vehicle including at least a charge inlet provided to the vehicle for receiving electric power from an external power supply, a power storage device configured to be capable of storing the electric power supplied to the charge inlet, a charging circuit for charging the power storage device, and a control circuit for controlling the charging circuit.

A vehicle 100 according to an embodiment of the present invention is mounted with an internal combustion engine (engine), a power storage device and an electric motor that is rotatably driven by electric power from the power storage device, and achieves a high fuel consumption efficiency by optimally distributing driving force generated by the internal combustion engine and that generated by the electric motor. Further, the power storage device mounted on vehicle 100 is chargeable with electric power from an external power supply (commercial power supply for example).

FIG. 1 is a side view of vehicle 100 according to an embodiment of the present invention. Referring to FIG. 1, a charge inlet 200 is provided to a vehicle body (body) 300. Charge inlet 200 includes a connector (not shown in FIG. 1) connected to a cable which is used for transmitting electric power supplied from a commercial power supply, and a lid 204 for preventing water, dust particles and the like from entering the connector. FIG. 1 shows a structure where charge inlet 200 is formed on the left side and the front-wheel side of vehicle body 300. The position of charge inlet 200, however, is not limited to a particular one.

In the vicinity of charge inlet 200, a lamp 211 is provided. When a coupler for coupling a vehicle and an external power supply is connected to vehicle 100 (charge inlet 200), lamp 211 starts flashing on and off.

A description will be given of an operation of lamp 211 in the case where the coupler is first connected to charge inlet 200 and then connected to a commercial power supply. During the period from the time when the coupler is connected to charge inlet 200 to the time when supply of electric power to vehicle 100 is started (the coupler is connected to the commercial power supply), lamp 211 is flashing on and off. After the supply of electric power to vehicle 100 is started, lamp 211 continuously lights up until charging of the power storage device is completed. After the charging of the power storage device is completed, lamp 211 flashes on and off again.

In contrast, an operation of lamp 211 in the case where the coupler is first connected to the commercial power supply and then connected to charge inlet 200 is as follows. In this case, simultaneously with connection of the coupler to charge inlet 200, electric power is supplied to the vehicle. Here, lamp 211 flashes on and off for a predetermined period (a few seconds for example) from the time when the coupler is connected to charge inlet 200, and then continuously lights up after the flashing period expires. After charging of the power storage device is completed, lamp 211 flashes on and off again.

In the vehicle body (body) of vehicle 100 according to the present embodiment, a fuel filler neck (not shown) for supplying fuel which is necessary for operating the internal combustion engine is formed.

Figure 2:
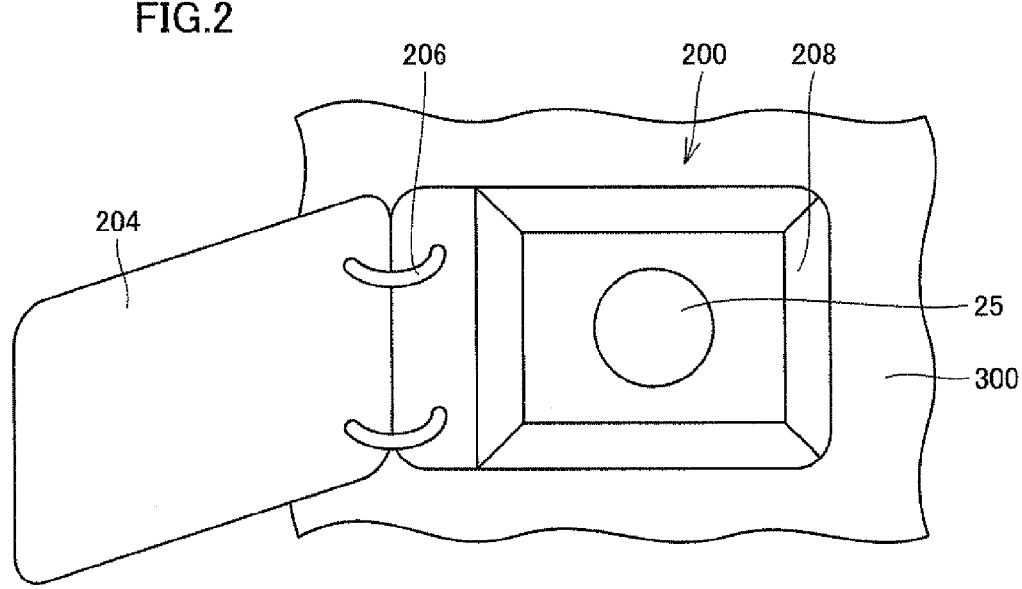
FIG. 2 is an external view of a charge inlet 200.

FIG. 2 is an external view of charge inlet 200. FIG. 2 shows the state where lid 204 is opened. Referring to FIG. 2, charge inlet 200 includes a housing 208 that is a depressed portion formed in the vehicle's external surface of vehicle body 300. Housing 208 houses a connector 25.

Lid 204 is pivotably supported by a support 206. A user can thus open and close lid 204.

Figure 3:
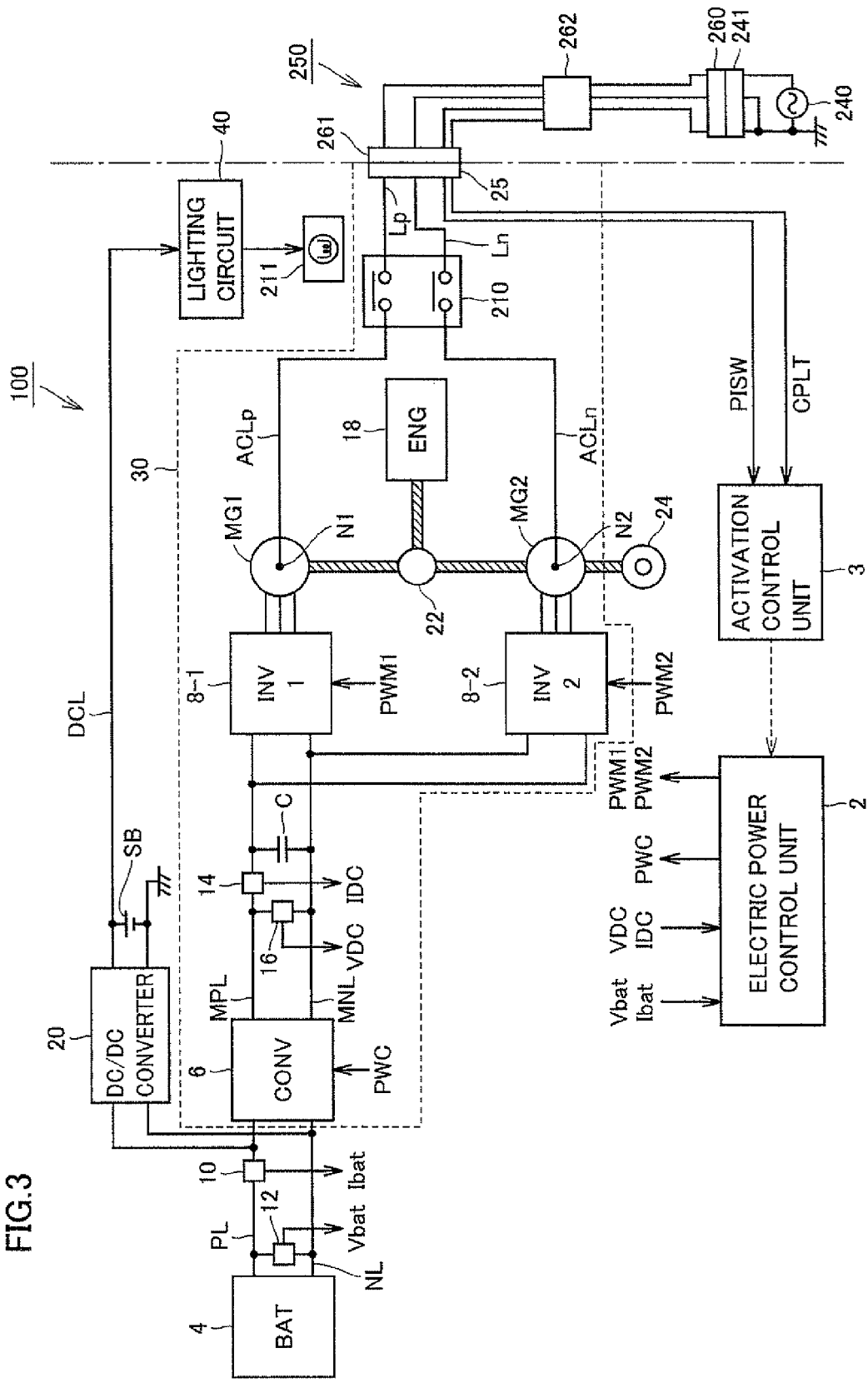
FIG. 3 is a schematic configuration diagram of vehicle 100.
Figure 4:
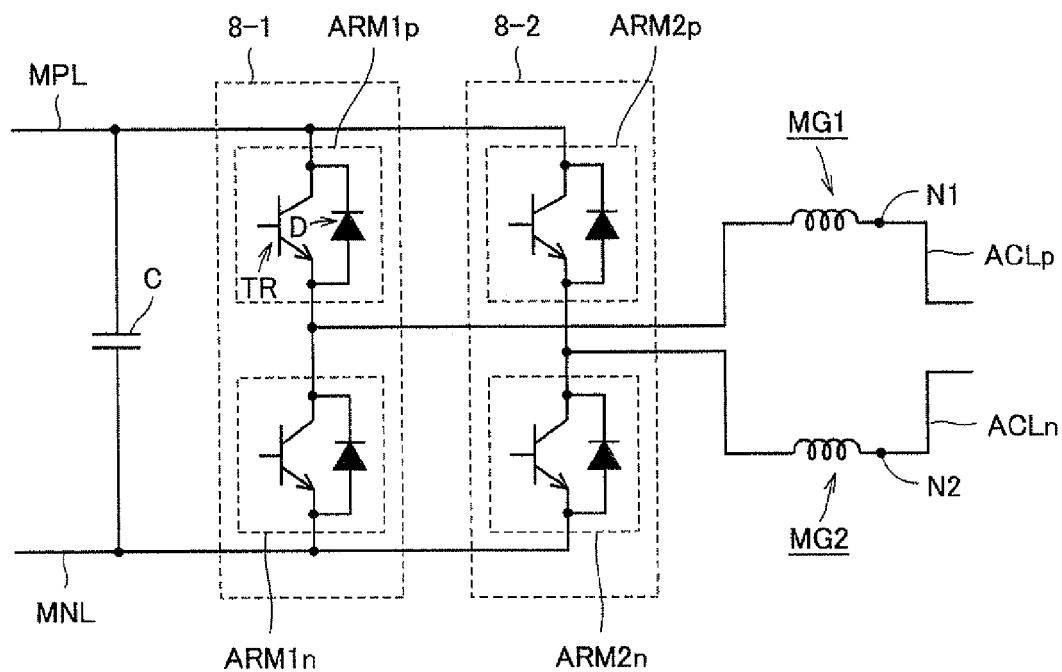
FIG. 4 is a diagram of a zero-phase equivalent circuit of inverters 8-1, 8-2 and motor generators MG1, MG2 in a zero-phase mode.

Referring next to FIGS. 3 and 4, a configuration of vehicle 100 will be described in more detail.

FIG. 3 is a schematic configuration diagram of vehicle 100. Referring to FIG. 3, vehicle 100 is a parallel/series hybrid vehicle.

Vehicle 100 includes a power storage device (BAT) 4 storing electric power for generating driving force for vehicle 100, a charging circuit 30 for charging power storage device 4 by transmitting electric power input to vehicle 100 to power storage device 4, an electric power control unit 2 for controlling charging circuit 30, and an activation control unit 3 for activating electric power control unit 2. In the present embodiment, charging circuit 30 also functions as a driving device using the electric power stored in power storage device 4 for driving vehicle 100.

Power storage device 4 is an electric power storage element that is configured to be chargeable and dischargeable. Power storage device 4 is formed, for example, of a secondary battery such as lithium-ion battery or nickel-metal hydride battery, or a power storage element such as electric double layer capacitor.

Charging circuit 30 includes a converter (CONV) 6, a main positive line MPL, a main negative line MNL, a capacitor C, a first inverter (INV1) 8-1, a second inverter (INV2) 8-2, a motor generator MG1, a motor generator MG2, an internal combustion engine (ENG) 18, and a power split device 22. Charging circuit 30 further includes connector 25, an AC port 210 and electric power lines Lp, Ln, ACLp, ACLn.

Converter 6 makes an interconversion between the input/output voltage of power storage device 4 and the voltage between main positive line MPL and main negative line MNL. The voltage conversion by converter 6 is controlled in accordance with switching command PWC from electric power control unit 2.

Capacitor C smoothes the voltage between main positive line MPL and main negative line MNL. Inverters 8-1, 8-2 are provided in association with motor generators MG1, MG2 respectively. Inverters 8-1, 8-2 are electrically connected, in parallel with each other, to power storage device 4. Inverters 8-1, 8-2 make an interconversion between DC (direct current) power and AC (alternating current) power.

AC port 210 includes a first relay for electrically connecting electric power line Lp and electric power line ACLp and a second relay for electrically connecting electric power line Ln and electric power line ACLn. The ON state and the OFF state of these first and second relays are controlled by electric power control unit 2.

Connector 25 is connected to a neutral point N1 of motor generator MG1 and a neutral point N2 of motor generator MG2 via electric power lines Lp, Ln, AC port 210 and electric power lines ACLp, ACLn. Motor generators MG1 and MG2 each include a stator having a U phase coil, a V phase coil and a W phase coil that are Y-connected (star-connected). The point where the Y-connected three coils are commonly connected corresponds to neutral point N1 of motor generator MG1 and neutral point N2 of motor generator MG2.

In the case where power storage device 4 is charged by external power supply 240, the electric power from external power supply 240 is transmitted to vehicle 100 by a coupler 250. Coupler 250 includes a plug 260, a connector 261 and a CCID (Charging Circuit Interrupt Device) 262.

Here, the voltage value and the type (DC or AC) of the electric power supplied from external power supply 240 are not limited to particular ones. For example, a commercial power supply providing electric power to each household may be used as external power supply 240. In the present embodiment, external power supply 240 is a commercial single-phase AC power supply (with its voltage value of 100 V or 200 V).

Plug 260 is connected for example to a power supply outlet 241 provided to a house of a household. To power supply outlet 241, AC power is supplied from external power supply 240 (system power supply for example).

Connector 261 is configured to be connectable to connector 25 provided to vehicle 100. When connector 261 is connected to connector 25, cable connection signal PISW indicating that connector 261 and connector 25 are connected is input to activation control unit 3.

CCID 262 electrically connects/disconnects external power supply 240 and vehicle 100 to/from each other. CCID 262 is operated by electric power provided from external power supply 240 in the case where plug 260 is connected to power supply outlet 241. CCID 262 generates pilot signal CPLT and outputs the generated pilot signal CPLT to activation control unit 3. When connector 261 is connected to connector 25 and the potential of pilot signal CPLT reaches a prescribed value, CCID 262 causes pilot signal CPLT to oscillate in accordance with a prescribed duty cycle (the ratio of the pulse width to the period of oscillation). The duty cycle is set based on the rated current that can be supplied from external power supply 240 via coupler 250 to the vehicle.

Charging of power storage device 4 by charging circuit 30 will be described. Electric power of external power supply 240 is provided to neutral points N1, N2 of motor generators MG1, MG2. In response to respective switching commands PWM1, PWM2, inverters 8-1, 8-2 perform switching operation. Thus, DC electric power having a predetermined voltage value is supplied from inverters 8-1, 8-2 to main positive line MPL and main negative line MNL.

More specifically, inverters 8-1, 8-2 each include three arm circuits corresponding respectively to three phases on the AC side. Each arm circuit includes an upper arm circuit and a lower arm circuit each having at least one switching element.

In inverters 8-1, 8-2 each, the upper arm circuits corresponding to respective phases are all turned on/off together, and the lower arm circuits corresponding to respective phases are also all turned on/off together. Thus, in inverters 8-1, 8-2 each, the three upper arm circuits can be regarded as being in the same switching state (all of the circuits are on or off). Similarly, the three lower arm circuits can be regarded as being in the same switching state. By this switching operation, respective phase voltages can be made equal to each other. Here, such a switching mode is also referred to as zero-phase mode.

FIG. 4 shows a zero-phase equivalent circuit of inverters 8-1, 8-2 and motor generators MG1, MG2 in the zero-phase mode. Referring to FIG. 4, in the case where inverters 8-1, 8-2 perform the switching operation in accordance with the above-described zero-phase mode, the three upper arm circuits of inverter 8-1 may be collectively represented as upper arm ARM1p, and the three lower arm circuits of inverter 8-1 may be collectively represented as lower arm ARM1n. Upper arm ARM1p and lower arm ARM1n are each formed of a switching element TR and a free-wheeling diode D. Similarly, the three upper arm circuits of inverter 8-2 may be collectively represented as upper arm ARM2p and the three lower arm circuits of inverter 8-2 may be collectively represented as lower arm ARM2n.

The zero-phase equivalent circuit shown in FIG. 4 can be regarded as a single phase inverter that can convert the DC power supplied through main positive line MPL and main negative line MNL into single-phase AC power, and convert single-phase AC power that is input to neutral points N1 and N2 through electric power lines ACLp, ACLn into DC power.

Specifically, inverters 8-1, 8-2 are controlled so that the zero-phase mode can be implemented, and accordingly inverters 8-1, 8-2 can be operated equivalently as single-phase inverters. Thus, the single-phase AC power supplied from external power supply 240 can be converted into the DC power, and this DC power can be supplied to main positive line MPL and main negative line MNL. The DC power is used to charge power storage device 4.

Referring again to FIG. 3, the configuration of vehicle 100 will be further described. Internal combustion engine 18 is operated through combustion of fuel. Motor generator MG1 can generate electric power by receiving a part of the motive power from internal combustion engine 18. Motor generator MG2 operates as an electric motor using the electric power from power storage device (BAT) 4.

Internal combustion engine 18 and motor generators MG1, MG2 are mechanically coupled to each other via power split device 22. Power split device 22 is typically formed of a planetary gear train.

When vehicle 100 is traveling, charging circuit 30 functions as a driving device (namely a load of power storage device 4) using electric power stored in power storage device 4 to generate driving force for the vehicle. Inverter 8-1 mainly converts the AC power generated by motor generator MG1 into DC power in accordance with switching command PWM1 from electric power control unit 2. Inverter 8-2 converts, in accordance with switching command PWM2 from electric power control unit 2, the DC power supplied through main positive line MPL and main negative line MNL into AC power and supplies the AC power to motor generator MG2. Power split device 22 splits the driving force generated by the operation of internal combustion engine 18 into two components and delivers the one to motor generator MG1 and the other to motor generator MG2.

The driving force delivered from power split device 22 to motor generator MG1 is used for generating electric power. The electric power generated by motor generator MG1 is used for charging power storage device 4, or used for generating driving force by motor generator MG2. The driving force delivered to motor generator MG2 is combined with driving force generated by motor generator MG2 to be used for driving drive wheels 24.

Here, the number of power storage devices and the capacity of the power storage device are not limited to particular ones. For example, a plurality of power storage devices may be mounted on vehicle 100. In the case where power storage devices 4 are charged by external power supply 240, power storage devices 4 can be sufficiently charged. In this case, the vehicle can travel by using only the driving force generated by motor generator MG2 while keeping internal combustion engine 18 in the halting state, namely the vehicle can travel in the so-called EV (Electric Vehicle) mode. For example, a larger quantity of electric power can be stored by increasing the number of power storage devices, so that the vehicle can travel over a longer distance in the EV mode.

Electric power control unit 2 and activation control unit 3 are each an ECU (Electronic Control Unit) for example including a CPU (Central Processing Unit), a RAM (Random Access Memory), a ROM (Read Only Memory), and an input/output interface.

Electric power control unit 2 controls charging circuit 30 based on information from current sensors 10, 14 and voltage sensors 12, 16. Current sensor 10 detects current Ibat that is electric current flowing through positive line PL (electric current input/output to/from power storage device 4). Voltage sensor 12 detects voltage Vbat between positive line PL and negative line NL. Current sensor 14 detects current IDC flowing through main positive line MPL. Voltage sensor 16 detects voltage VDC between main positive line MPL and main negative line MNL. Electric power control unit 2 receives respective values of current Ibat and current IDC and respective values of voltage Vbat and voltage VDC and outputs switching commands PWM1, PWM2, PWC.

Activation control unit 3 activates electric power control unit 2 when connector 261 is connected to connector 25 of vehicle 100 and the input electric power from external power supply 240 to connector 25 is detected. When electric power control unit 2 is activated by activation control unit 3, electric power control unit 2 controls charging circuit 30. Accordingly, power storage device 4 is charged.

Vehicle 100 further includes a DC/DC converter 20, an auxiliary battery SB, a lighting circuit 40, and lamp 211. DC/DC converter 20 is electrically connected, in parallel with converter 6, to power storage device 4. DC/DC converter 20 lowers the electric power discharged from power storage device 4 to generate auxiliary electric power. The voltage of the auxiliary electric power is set to a voltage (12 V or 24 V for example) lower than a charging and discharging voltage of the power storage device (288 V for example).

The auxiliary electric power generated by DC/DC converter 20 is supplied via an electric power line DCL to various auxiliary components (not shown) of vehicle 100, and a part thereof is supplied to auxiliary battery SB. Auxiliary battery SB stores the auxiliary electric power.

Even when vehicle 100 is in the non-operating state (ignition-off state), auxiliary battery SB can be used to supply the auxiliary electric power to each auxiliary component. Here, the electric power stored in auxiliary battery SB is supplied to at least electric power control unit 2, activation control unit 3 and lighting circuit 40.

Auxiliary battery SB is charged together with power storage device 4 for example by external power supply 240. While power storage device 4 is charged, for example, DC/DC converter 20 may be operated to charge power storage device 4 and auxiliary battery SB.

Lighting circuit 40 causes lamp 211 to light up. Here, "lighting up" includes both of flashing on and off and continuous lighting up. Lamp 211 is an LED (Light Emitting Diode) for example. The LED can be used for lamp 211 to reduce the power consumption of lamp 211.

Figure 5:
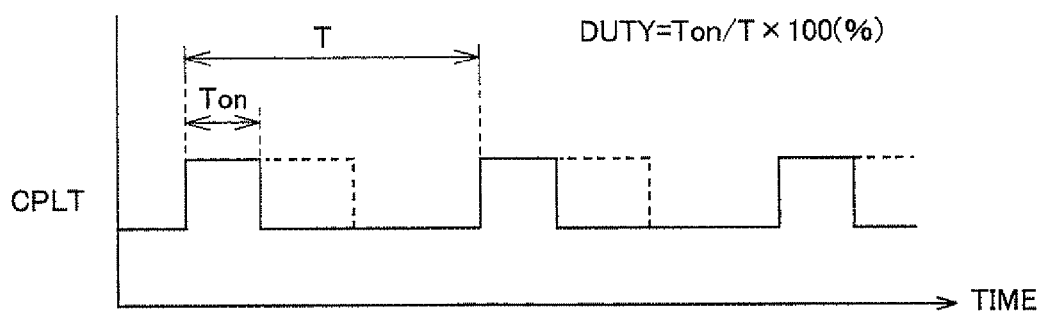
FIG. 5 is a diagram showing a waveform of pilot signal CPLT generated by a CCID 262 shown in FIG. 3.

CCID 262 and pilot signal CPLT will now be described in more detail. FIG. 5 is a diagram showing a waveform of pilot signal CPLT generated by CCID 262 shown in FIG. 3.

Referring to FIG. 5, pilot signal CPLT oscillates with a prescribed period T. A pulse width Ton of pilot signal CPLT is set based on the rated current that can be provided from external power supply 240 to vehicle 100 via coupler 250. Activation control unit 3 (see FIG. 3) included in vehicle 100 receives pilot signal CPLT from CCID 262. When pilot signal CPLT periodically changes, activation control unit 3 determines that electric power supply from external power supply 240 to vehicle 100 (connector 25) is started.

The rated current is defined for each charge cable provided to the coupler. For charge cables of different types, duties of pilot signal CPLT are different from each other because respective rated currents of the charge cables are different from each other. Therefore, not only activation control unit 3 but electric power control unit 2 may receive pilot signal CPLT. In this case, electric power control unit 2 can detect the rated current that can be supplied to vehicle 100 by detecting the duty of the received pilot signal CPLT. Therefore, electric power control unit 2 can control inverters 8-1, 8-2 based on the detected rated current.

Figure 6:
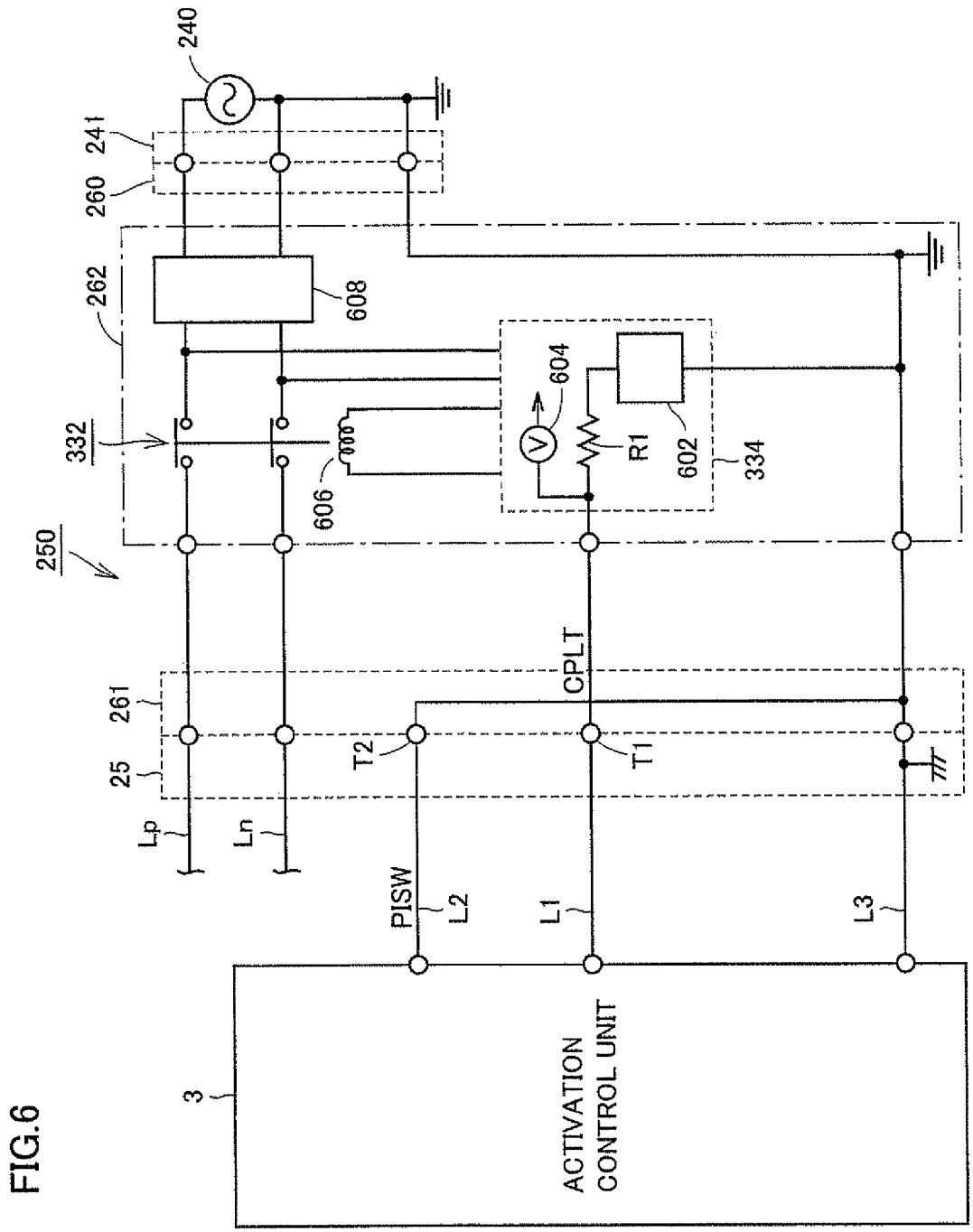
FIG. 6 is a diagram illustrating a configuration of CCID 262 shown in FIG. 3.

FIG. 6 is a diagram illustrating a configuration of CCID 262 shown in FIG. 3. Referring to FIG. 6, CCID 262 includes a relay 332, a control pilot circuit 334, an electromagnetic coil 606, and an electrical leakage detector 608. Control pilot circuit 334 includes an oscillator 602, a resistor R1 and a voltage sensor 604.

When power supply outlet 241 and plug 260 are connected, oscillator 602 receives electric power provided from external power supply 240. Oscillator 602 is operated by this electric power. Oscillator 602 outputs a non-oscillating signal when the potential of pilot signal CPLT detected by voltage sensor 604 is close to a prescribed potential V1 (12 V for example), and outputs a signal oscillating at a prescribed frequency (1 kHz for example) and a prescribed duty cycle when the potential of pilot signal CPLT decreases from V1. The potential of pilot signal CPLT is changed by changing the resistance value of a resistance circuit (not shown) included in activation control unit 3.

Control pilot circuit 334 supplies electric current to electromagnetic coil 606 when the potential of pilot signal CPLT is close to a prescribed potential V2 (6 V for example). Electromagnetic coil 606 generates an electromagnetic force when supplied with electric current from control pilot circuit 334 and turns on relay 332. When connector 261 is connected to connector 25 and relay 332 is turned on, a pair of electric power lines used for supplying charge electric power from external power supply 240 to vehicle 100 is electrically connected to electric power lines Lp, Ln.

Electrical leakage detector 608 is provided on the pair of electric power lines used for supplying charge electric power from external power supply 240 to vehicle 100, for detecting whether electrical leakage occurs or not. Specifically, electrical leakage detector 608 detects the state of balance between electric currents flowing in the opposite directions through the pair of electric power lines. When the state of balance is lost, electrical leakage detector 608 detects occurrence of electrical leakage. When electrical leakage is detected by electrical leakage detector 608, power feeding to electromagnetic coil 606 is interrupted and relay 332 is turned off, which is not particularly shown. The potential of pilot signal CPLT is fixed to a prescribed negative potential (−12 V for example).

Pilot signal CPLT is output from control pilot circuit 334 to a terminal T1. Terminal T1 is connected by control pilot line L1 to activation control unit 3. Accordingly, pilot signal CPLT which is output from control pilot circuit 334 is input to activation control unit 3 via control pilot line L1.

A terminal T2 of connector 25 and activation control unit 3 are connected by signal line L2. When connector 261 is connected to connector 25, the potential of cable connection signal PISW becomes the ground level. Namely, cable connection signal PISW is a signal having an L (logical low) level when connector 261 is connected to connector 25 and having an H (logical high) level when connector 261 is not connected to connector 25. A ground terminal of activation control unit 3 is connected by a ground line L3 to a ground node.

In the following "cable connection signal PISW is input to activation control unit 3" means that cable connection signal PISW has the L level.

Figure 7:
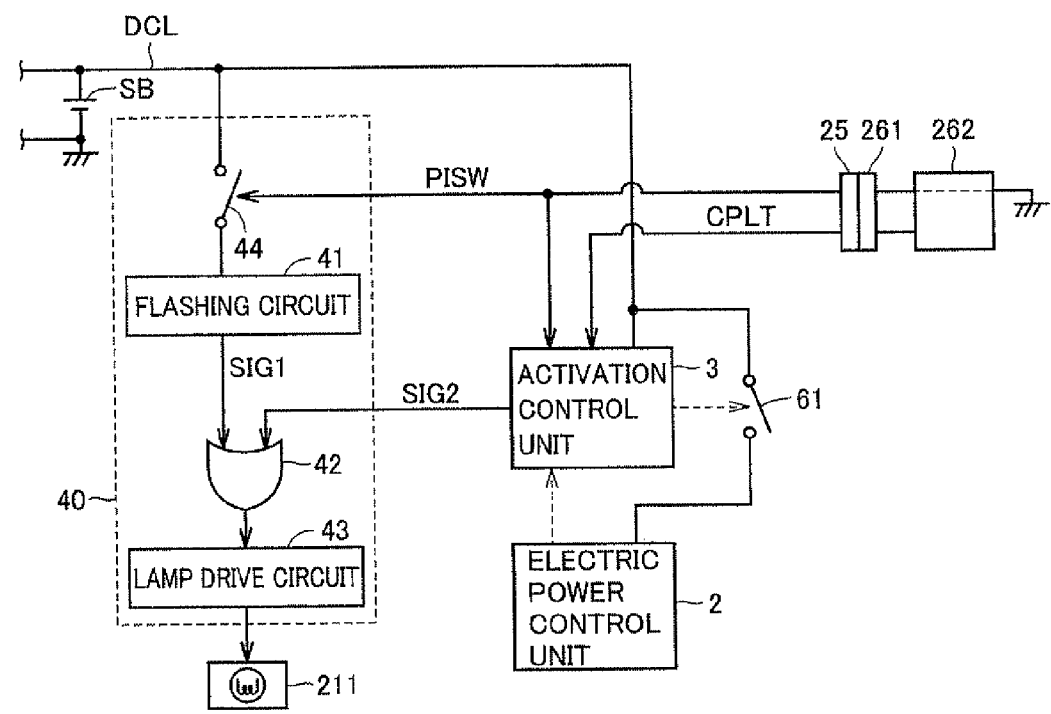
FIG. 7 is a configuration diagram of a lighting circuit 40.

FIG. 7 is a configuration diagram of lighting circuit 40. Referring to FIG. 7, lighting circuit 40 includes a flashing circuit 41, an OR circuit 42, a lamp drive circuit 43, and a switch 44.

Flashing circuit 41 receives electric power from auxiliary battery SB via electric power line DCL when switch 44 is ON. When the electric power is supplied from auxiliary battery SB to flashing circuit 41, flashing circuit 41 outputs a periodically changing signal.

OR circuit 42 receives signal SIG1 from flashing circuit 41 and signal SIG2 from activation control unit 3 to generate a logical sum of these inputs.

Lamp drive circuit 43 drives lamp 211 in response to the output from OR circuit 42.

Switch 44 is turned on in response to cable connection signal PISW of L level, and turned off in response to cable connection signal PISW of H level. The signal line for transmitting cable connection signal PISW is grounded via CCID 262 when connector 261 is connected to connector 25. Cable connection signal PISW accordingly has L level. Namely, switch 44 is turned on when connector 261 is connected to connector 25.

Activation control unit 3 turns on a switch 61 when receiving cable connection signal PISW of L level and pilot signal CPLT. Switch 61 is provided between electric power line DCL and electric power control unit 2. When switch 61 is OFF, electric power is not supplied to electric power control unit 2 and therefore, electric power control unit 2 is in the halting state. When switch 61 is turned on, the electric power stored in auxiliary battery SB is supplied to electric power control unit 2 via electric power line DCL and switch 61. Accordingly, electric power control unit 2 is activated so that electric power control unit 2 switches from the halting state to the operating state.

Activation control unit 3 turns on switch 61 and outputs signal SIG2 of H level to OR circuit 42. In contrast, when activation control unit 3 receives cable connection signal PISW only or receives none of cable connection signal PISW and pilot signal CPLT, activation control unit 3 outputs signal SIG2 of L level to OR circuit 42.

In the case where flashing circuit 41 outputs signal SIG1 (first signal) that periodically changes and activation control unit 3 outputs signal SIG2 of L level to OR circuit 42, OR circuit 42 outputs signal SIG1 from flashing circuit 41 as it is, as it were. In other words, the output signal from OR circuit 42 changes in synchronization with signal SIG1 that is output from flashing circuit 41. Since lamp drive circuit 43 drives lamp 211 in accordance with the output signal from OR circuit 42, lamp 211 flashes on and off (first pattern).

In contrast, in the case where activation control unit 3 outputs signal SIG2 (second signal) of H level to OR circuit 42, OR circuit 42 outputs a signal of H level all the time, even if flashing circuit 41 outputs a periodically changing signal. Since lamp drive circuit 43 drives lamp 211 in accordance with the signal of H level, lamp 211 continuously lights up (second pattern).

When charging of power storage device 4 is completed, electric power control unit 2 outputs to activation control unit 3 a signal indicating completion of the charging. In response to this signal, activation control unit 3 turns off switch 61 and outputs signal SIG2 of L level to OR circuit 42.

In the case where plug 260 (see FIG. 3) is not connected to power supply outlet 241 (see FIG. 3) while connector 261 of the coupler is connected to connector 25, electric power is not supplied to connector 25. In this case, of cable connection signal PISW and pilot signal CPLT, only cable connection signal PISW is input to activation control unit 3, and thus activation control unit 3 does not turn on switch 61. Therefore, electric power is not supplied to electric power control unit 2. Further, since the level of signal SIG2 that is output from activation control unit 3 to OR circuit 42 remains L level, OR circuit 42 outputs signal SIG1 received from flashing circuit 41 to lamp drive circuit 43 as it is, as it were. Lamp 211 accordingly flashes on and off.

In contrast, in the case where connector 261 is connected to connector 25 after plug 260 is connected to power supply outlet 241, both of cable connection signal PISW and pilot signal CPLT are input to activation control unit 3. In this case, activation control unit 3 turns on switch 61. Further, activation control unit 3 outputs signal SIG2 of H level to OR circuit 42, after a predetermined time (ten seconds for example) has elapsed from the time when cable connection signal PISW and pilot signal CPLT are input. Therefore, lamp 211 flashes on and off for the above-referenced predetermined time from the time when connector 261 is connected to connector 25, and thereafter continuously lights up.

Here, activation control unit 3 and electric power control unit 2 are not limited to separate control devices respectively. For example, they may be two functional blocks respectively in one control device. Further, switch 61 may also be provided in the control device.

Figure 8:
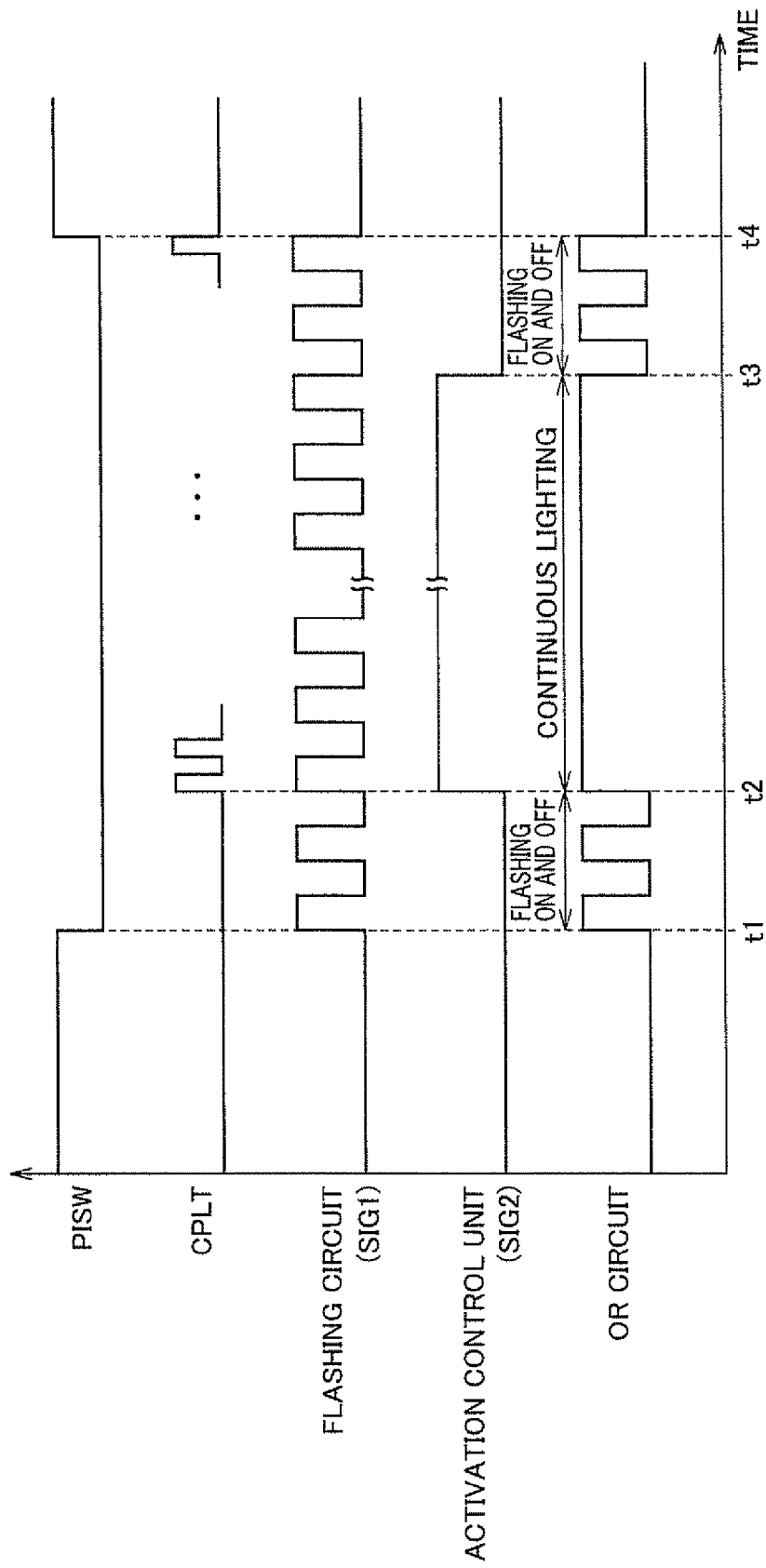
FIG. 8 is a first timing chart for illustrating an operation of a lamp 211.

FIG. 8 is a first timing chart for illustrating an operation of lamp 211. This timing chart shows the operation of lamp 211 in the case where connector 261 is first connected to connector 25 and thereafter plug 260 is connected to power supply outlet 241.

Referring to FIGS. 8 and 7, at time t1, connector 261 is connected to connector 25 and accordingly cable connection signal PISW becomes L level. Here, pilot signal CPLT is L level at time t1.

Switch 44 is turned on at time t1 and accordingly electric power is supplied to flashing circuit 41. Thus, flashing circuit 41 starts outputting a periodically changing signal (SIG1). In contrast, at time t1, a signal (SIG2) that is output from activation control unit 3 is L level. Therefore, OR circuit 42 outputs signal SIG1 that is output from flashing circuit 41 as it is, as it were. Accordingly, lamp 211 flashes on and off (first pattern).

At time t2, plug 260 is connected to power supply outlet 241. Accordingly, pilot signal CPLT periodically changes. When activation control unit 3 detects that pilot signal CPLT periodically changes, activation control unit 3 outputs signal SIG2 of H level to OR circuit 42. Thus, the signal output from OR circuit 42 becomes H level. Therefore, after time t2, lamp 211 continuously lights up (second pattern).

At time t3, charging of power storage device 4 by electric power control unit 2 (and charging circuit 30) is completed. Receiving a signal indicating the completion of charging from electric power control unit 2, activation control unit 3 changes the level of signal SIG2 that is output to OR circuit 42 from H level to L level. Here, flashing circuit 41 still outputs signal SIG1. Therefore, OR circuit 42 outputs a signal that changes in synchronization with signal SIG1 from flashing circuit 41. Accordingly, after time t3, lamp 211 flashes on and off (first pattern).

At time t4, a user disconnects connector 261 from connector 25. Accordingly, the level of cable connection signal PISW changes from L level to H level. Further, input of pilot signal CPLT to activation control unit 3 is ended. At time t4, switch 44 is turned off, and the signal that is output from the OR circuit becomes L level. Accordingly, lamp 211 is turned off.

Figure 9:
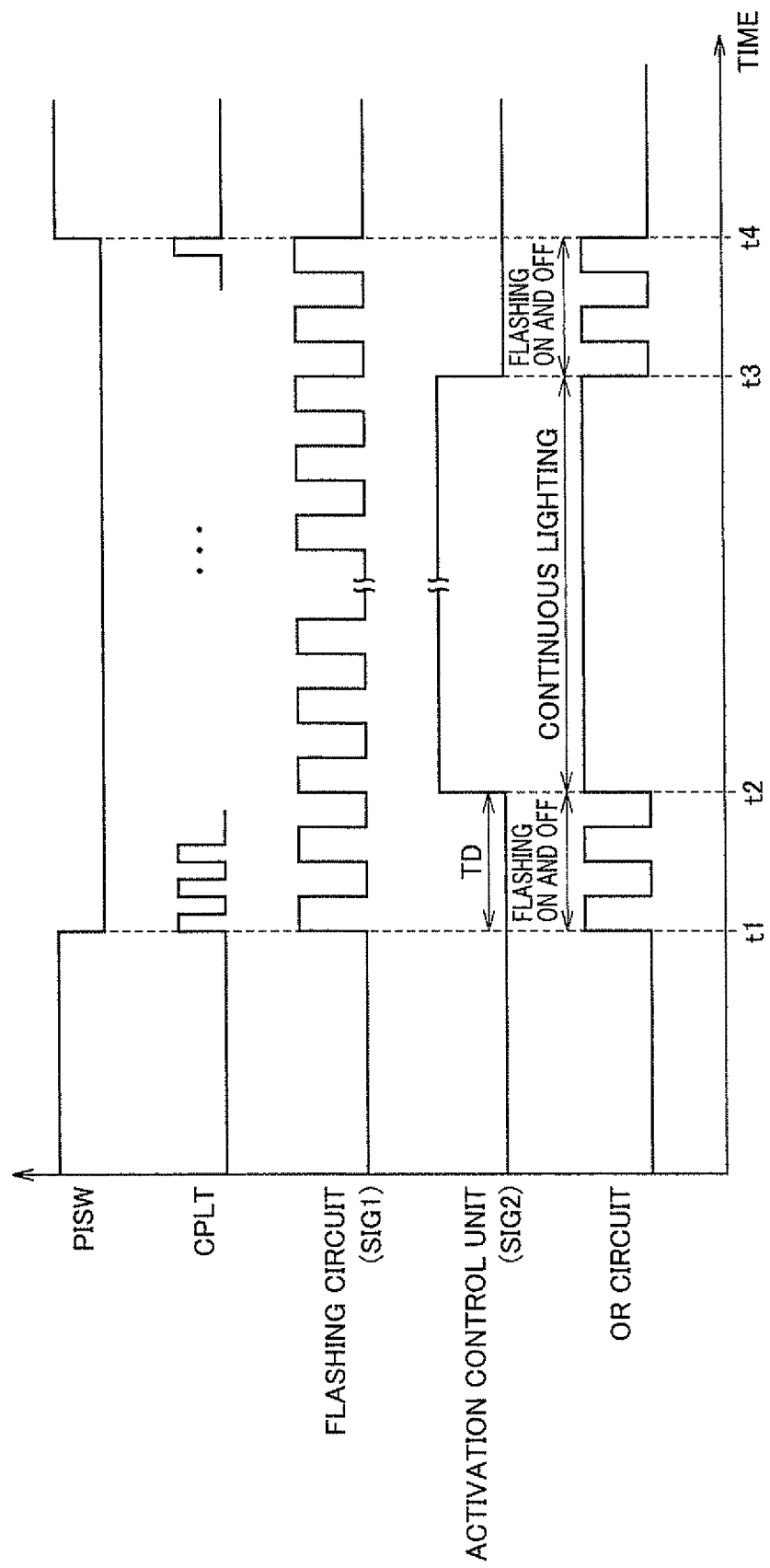
FIG. 9 is a second timing chart for illustrating an operation of lamp 211.

FIG. 9 is a second timing chart for illustrating an operation of lamp 211. This timing chart shows the operation of lamp 211 in the case where plug 260 is first connected to power supply outlet 241 and thereafter connector 261 is connected to connector 25.

Referring to FIG. 9, at time t1, connector 261 is connected to connector 25 and accordingly cable connection signal PISW becomes L level. Further, at time t1, pilot signal CPLT periodically changes. At time t1, switch 44 is turned on and thus flashing circuit 41 starts outputting a periodically changing signal (SIG1). When activation control unit 3 receives both of cable connection signal PISW and pilot signal CPLT, however, activation control unit 3 does not outputs the signal (SIG2) of H level until predetermine period TD has elapsed from time t1. At time t2 when predetermined period TD has elapsed, activation control unit 3 outputs the signal (SIG2) of H level. After time t2, cable connection signal PISW, pilot signal CPLT, the output signal (SIG1) of flashing circuit 41, the output signal (SIG2) of activation control unit 3, and the output signal of OR circuit 42 change similarly to those in the timing chart (after time t2) of FIG. 8, and the description thereof will not be repeated.

Figure 10:
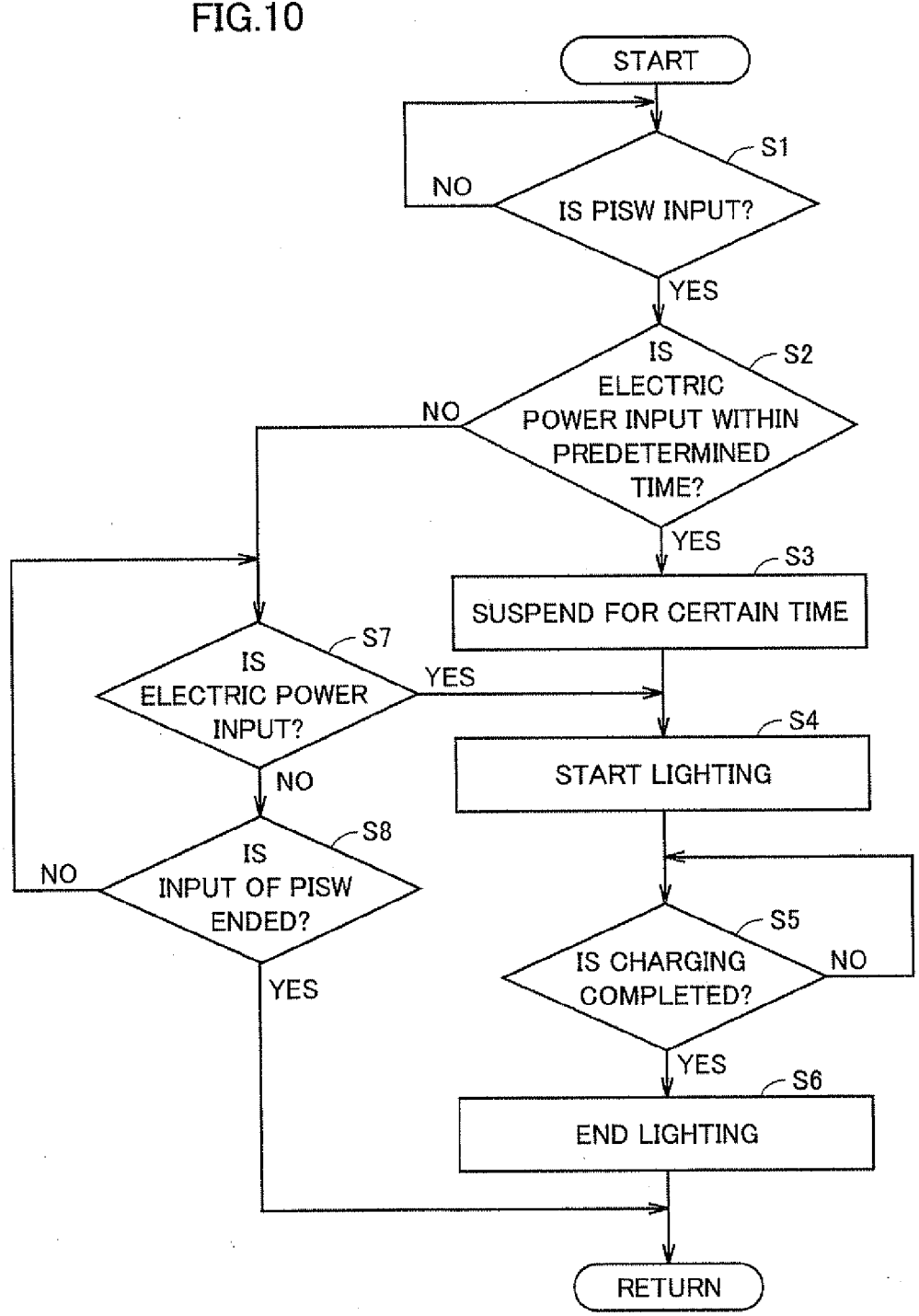
FIG. 10 is a flowchart illustrating a control process for lighting circuit 40 that is executed by an activation control unit 3.

FIG. 10 is a flowchart illustrating a control process for lighting circuit 40 that is executed by activation control unit 3. The condition on which the process shown by this flowchart is started is, for example, a predetermined condition is satisfied (when lid 204 of the charge inlet is opened, for example), and the process is called from a main routine when the condition is satisfied.

Referring to FIGS. 10 and 7, the process is started and then activation control unit 3 determines in step S1 whether cable connection signal PISW is input. When cable connection signal PISW is input (YES in step S1), the process proceeds to step S2. In contrast, when cable connection signal PISW is not input, namely the level of cable connection signal PISW is H level (NO in step S1), the determination in step S1 is repeated.

In step S2, activation control unit 3 determines whether electric power is input to the charge inlet (connector 25) within a predetermined period (one second for example) from the time when cable connection signal PISW is input. When activation control unit 3 receives pilot signal CPLT, activation control unit 3 determines that electric power is input to connector 25.

In the case where plug 260 is first connected to power supply outlet 241 and thereafter connector 261 is connected to connector 25, cable connections signal PISW and pilot signal CPLT are almost simultaneously input to activation control unit 3. Therefore, in this case (YES in step S2), the process proceeds to step S3.

In contrast, in the case where connector 261 is first connected to connector 25 and thereafter plug 260 is connected to power supply outlet 241, pilot signal CPLT is input to activation control unit 3 after a predetermined time has elapsed from the time when cable connection signal PISW is input to activation control unit 3. In this case (NO in step S2), the process proceeds to step S7 as described later.

In step S3, activation control unit 3 suspends output of the signal (signal SIG2 of H level) to OR circuit 42 for a certain time (period TD shown in FIG. 9, ten seconds for example). After step S3, the process proceeds to step S4.

In contrast, in step S7, activation control unit 3 determines whether electric power is input to the charge inlet (connector 25). Like step S2, activation control unit 3 determines that electric power is input to connector 25 when activation control unit 3 receives pilot signal CPLT. In the case where pilot signal CPLT is input to activation control unit 3 (YES in step S7), the process proceeds to step S4. When pilot signal CPLT is not input to activation control unit 3 (NO in step S7), the process proceeds to step S8.

In step S8, activation control unit 3 determines whether input of cable connection signal PISW is ended. When a user disconnects connector 261 from connector 25, the input of cable connection signal PISW is ended. In this case (YES in step S8), the whole process is returned to the main routine. In the case where cable connection signal PISW is input to activation control unit 3 (NO in step S8), the process returns to step S7.

Namely, steps S7 and S8 are repeated from the time when cable connection signal PISW is input to activation control unit 3 to the time when pilot signal CPLT is input to activation control unit 3.

In step S4, activation control unit 3 starts lighting up lamp 211. As described above, activation control unit 3 outputs signal SIG2 of H level to OR circuit 42. Thus, lamp 211 continuously lights up.

In step S5, activation control unit 3 determines whether charging of power storage device 4 by electric power control unit 2 and charging circuit 30 (see FIG. 3) is completed. Activation control unit 3 determines that charging of power storage device 4 is completed when activation control unit 3 receives a signal indicating the completion of charging from electric power control unit 2. In this case (YES in step S5), the process proceeds to step S6. In contrast, when activation control unit 3 does not receive the signal from electric power control unit 2 (NO in step S5), step S5 is repeated until activation control unit 3 receives this signal.

In step S6, activation control unit 3 outputs signal SIG2 of L level to OR circuit 42. Accordingly, lighting up of lamp 211 by activation control unit 3 is ended. After this, lamp 211 flashes on and off in accordance with signal SIG1 from flashing circuit 41. After step S6 is ended, the whole process is returned to the main routine.

According to the present embodiment, useless consumption of electric power (particularly the electric power stored in auxiliary battery SB) can be reduced. It is supposed for example that a user connects connector 261 to connector 25 for charging the power storage device. If, however, the user forgets about connecting plug 260 to power supply outlet 241, coupler 250 remains unconnected to external power supply 240 for a some long period of time (a few hours for example). According to the present embodiment, supply of electric power to electric power control unit 2 is stopped for this period of time, and thus the power consumption of electric power control unit 2 can be reduced. In this way, useless consumption of the electric power stored in auxiliary battery SB can be reduced.

Further, according to the present embodiment, the lamp is caused to light up in different patterns respectively in the case where the coupler is connected to the charge inlet and the case where electric power is input to the charge inlet. In this way, a user can be informed of the current charging status. In the case for example where the lamp remains flashing on and off, it is more likely that the user notices the fact that plug 260 is not connected to power supply outlet 241. Thus, the power storage device can more surely be charged.

Further, according to the present embodiment, lamp 211 is caused to flash on and off in the case where plug 260 is not connected to power supply outlet 241 while connector 261 is connected to connector 25. Namely, lamp 211 operates intermittently. In the present embodiment, the electric power stored in auxiliary battery SB is used for lighting up lamp 211. According to the present embodiment, therefore, useless consumption of the electric power stored in auxiliary battery SB can further be reduced.

Further, according to the present embodiment, in the case where electric power is supplied to connector 25 simultaneously with connection of connector 261 to connector 25 (plug 260 has been connected to power supply outlet 241 in advance), lamp 211 is caused to flash on and of for a predetermined period from the time when electric power is supplied to connector 25, and thereafter the lamp is caused to continuously light up. In such a case, if lamp 211 starts lighting up continuously at the same time when connector 261 and connector 25 are connected, an abnormality of flashing circuit 41 (signal SIG1 is H level all the time), if occurs, cannot be detected. Signal SIG2 of H level is output when a predetermined time has elapsed from the time when activation control unit 3 detects that electric power is supplied to connector 25, so that a period in which lamp 211 operates in accordance with the signal of flashing circuit 41 can be provided. In this way, an abnormality of flashing circuit 41 can be detected.

Modifications

The configuration for charging a power storage device mounted on a vehicle by an external power supply is not limited to the configuration shown in FIG. 3. In the following, modifications of the vehicle according to the present embodiment will be described.

Figure 11:
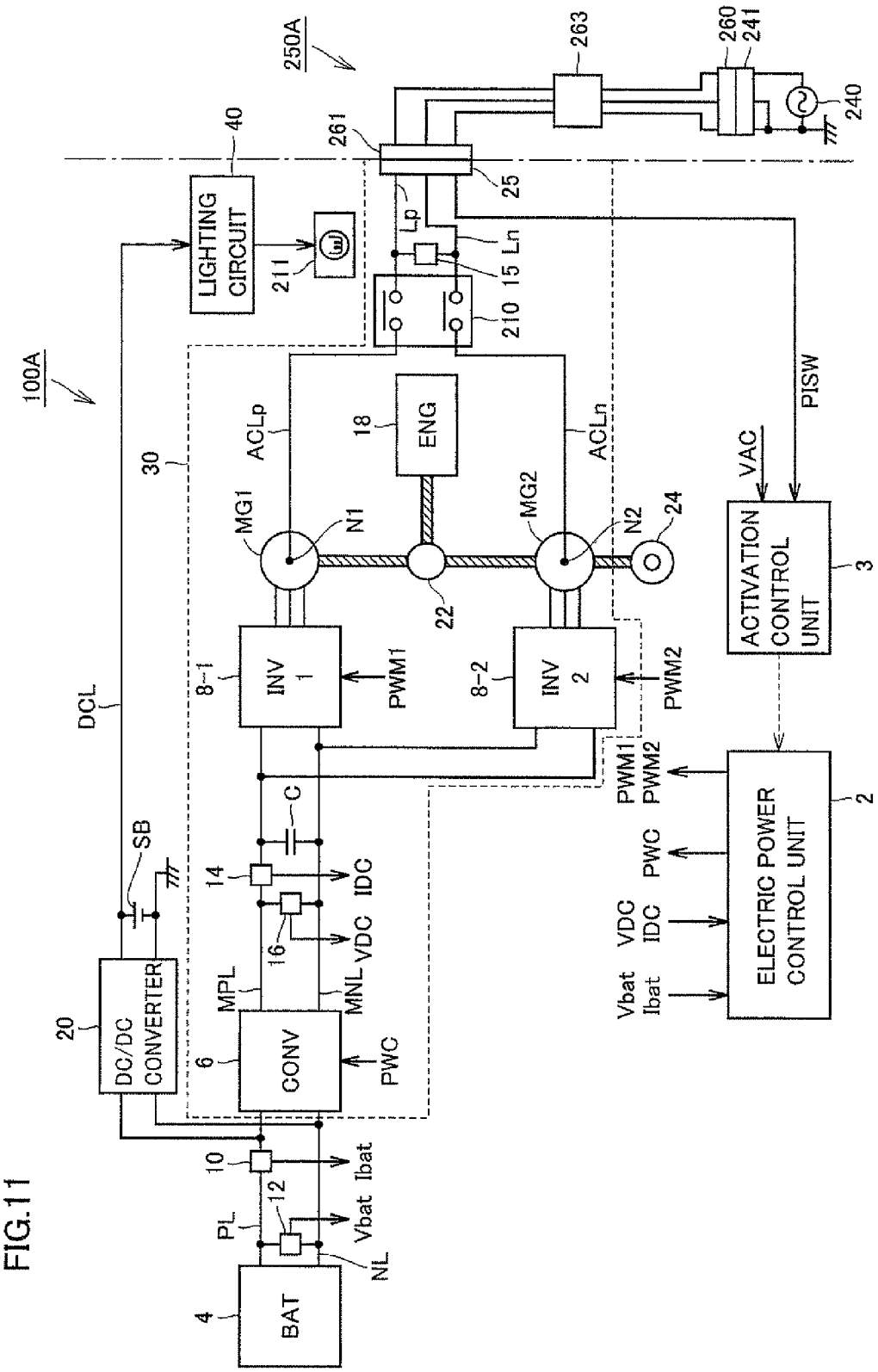
FIG. 11 shows a first modification of the vehicle according to the present embodiment.

FIG. 11 is a diagram showing a first modification of the vehicle according to the present embodiment. Referring to FIG. 11, vehicle 100A differs from vehicle 100 shown in FIG. 3 in that the former further includes a voltage sensor 15 provided between electric power lines Lp and Ln. Further, in a coupler 250A, a control box 263 is provided instead of CCID 262. This control box 263 differs from CCID 262 in that the former does not generate pilot signal CPLT.

Voltage sensor 15 detects voltage VAC applied between electric power lines Lp and Ln and outputs detected voltage VAC to activation control unit 3. When voltage VAC is equal to or larger than a predetermined value, activation control unit 3 determines that electric power is supplied to connector 25. Namely, in the present modification, the vehicle differs from vehicle 100 shown in FIG. 3 in that voltage VAC, instead of pilot signal CPLT, is input to activation control unit 3.

In this modification, the operations of activation control unit 3 (namely activation of electric power control unit 2 and control for lighting up lamp 211) correspond to the operations illustrated in FIGS. 7 to 10 in which pilot signal CPLT is replaced with voltage VAC.

Figure 12:
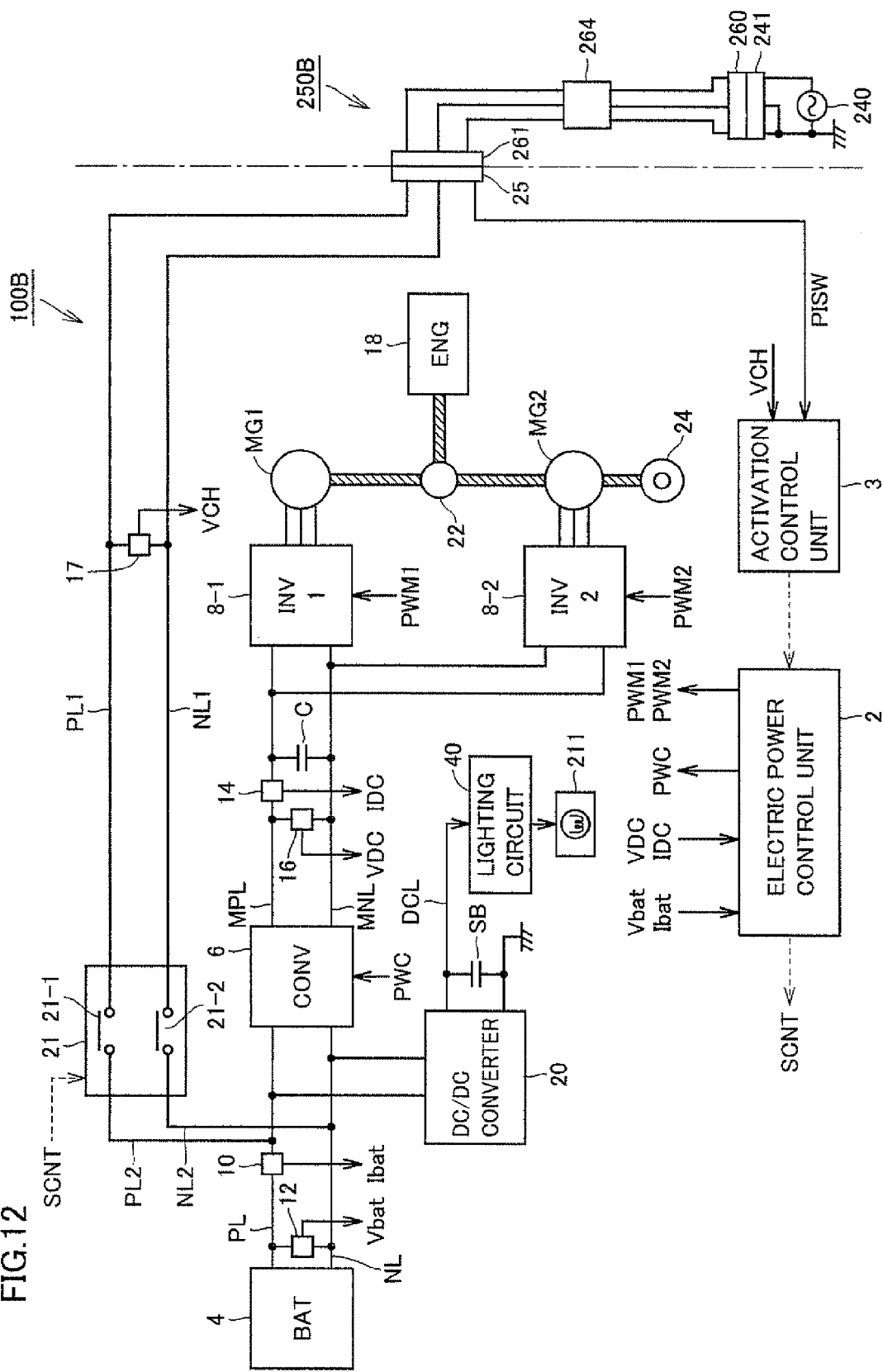
FIG. 12 shows a second modification of the vehicle according to the present embodiment.

FIG. 12 is a diagram showing a second modification of the vehicle according to the present embodiment. Referring to FIG. 12, in a coupler 250B, a voltage converter 264 is provided instead of CCID 262. Voltage converter 264 rectifies an AC voltage from external power supply 240, and converts the voltage to a voltage appropriate for charging power storage device 4.

Vehicle 100B differs from vehicle 100 in that the former includes a connection unit 21, electric power lines PL1, NL1, PL2, NL2 and a voltage sensor 17 instead of AC port 210 and electric power lines ACLp, ACLn, Lp, Ln. Connection unit 21 includes relays 21-1, 21-2.

Electric power line PL1 connects connector 25 and one terminal of relay 21-1. Electric power line PL2 connects positive line PL and the other terminal of relay 21-1.

Electric power line NL1 connects connector 25 and one terminal of relay 21-2, Electric power line NL2 connects negative line NL and the other terminal of relay 21-2.

Voltage sensor 17 detects a DC voltage between electric power line PL1 and electric power line NL1, and outputs detected voltage VCH to activation control unit 3. When voltage VCH is equal to or larger than a predetermined value, activation control unit 3 determines that electric power is supplied to connector 25. Namely, the vehicle in this modification differs from vehicle 100 shown in FIG. 3 in that voltage VCH, instead of pilot signal CPLT, is input to activation control unit 3.

When electric power control unit 2 is activated by activation control unit 3, electric power control unit 2 transmits control signal SCNT to connection unit 21 (relays 21-1, 21-2). Relays 21-1, 21-2 are turned on and off in accordance with control signal SCNT. For example, when control signal SCNT is H level, relays 21-1, 21-2 are turned on. Accordingly, electric power lines PL1, NL1 are connected respectively to electric power lines PL2, NL2. Thus, between power storage device 4 and connector 25, a power feeding portion (a power feeding passage for transmitting the electric power supplied to connector 25 to the power storage device) constituted of electric power lines PL1, NL1, connection unit 21, electric power lines PL2, NL2, positive line PL, and negative line NL is formed.

When charging of power storage device 4 is completed, electric power control unit 2 changes control signal SCNT to L level. Accordingly, relays 21-1, 21-2 are turned off. Thus, the power feeding passage between power storage device 4 and connector 25 is broken.

In this modification, the operations of activation control unit 3 (namely activation of electric power control unit 2 and control for lighting up lamp 211) correspond to the operations illustrated in FIGS. 7 to 10 in which pilot signal CPLT is replaced with voltage VCH.

Further, although voltage converter 264 is provided outside the vehicle in this modification, voltage converter 264 maybe mounted on the vehicle.

As seen from above, the present invention is applicable to any vehicle as long as the vehicle is configured such that coupler 250 (connector 261) is connected to connector 25 provided to the vehicle and supply of electric power to connector 25 can be detected. Therefore, the configuration for charging a power storage device mounted on a vehicle by means of an external power supply is not limited to a particular one.

Here, lamp 211 and lamp drive circuit 43 constitute "informing unit" of the present invention. Flashing circuit 41 corresponds to "signal transmission unit" of the present invention. OR circuit 42 corresponds to "signal selection unit" of the present invention. Pilot signal CPLT corresponds to "electric power information" of the present invention.

Further, in the present embodiment, lamp 211 flashes on and off when connector 261 is connected to connector 25, and lamp 211 continuously lights up when plug 260 is connected to power supply outlet 241 and accordingly electric power control unit 2 is activated. Alternatively, the lamp may light up when connector 261 is connected to connector 25, and lamp 211 may flash on and off when electric power control unit 2 is activated.

Further, activation control unit 3 may be configured to activate electric power control unit 2 when charging is started at the time specified by a user. In this case as well, it may occur that a certain time elapses from the time when connector 261 is connected to connector 25 to the user's specified time at which charging is started. Therefore, the present invention can be applied to reduce useless consumption of the electric power stored in auxiliary battery SB.

Further, the foregoing description is applied to a series/parallel hybrid vehicle capable of splitting the motive power of internal combustion engine 18 by means of power split device 22 to deliver the motive power to drive wheels 24 and motor generator MG1. The present invention, however, is applicable to hybrid vehicles of other types as well. Specifically, the present invention is also applicable to a so-called series hybrid vehicle using internal combustion engine 18 only for the purpose of driving motor generator MG1 and generating the driving force for the vehicle only by means of motor generator MG2, a hybrid vehicle collecting only the regenerative energy, of the kinetic energy generated by internal combustion engine 18, as electric energy, or a motor-assist-type hybrid vehicle using the engine as a main motive power source and assisted as required by a motor.

Furthermore, the present invention is also applicable to a hybrid vehicle without converter 6.

Furthermore, the present invention is applicable to an electric vehicle traveling with electric power only without internal combustion engine 18, or a fuel cell vehicle including, as electric power sources, a fuel cell in addition to a power storage device.

It should be construed that embodiments disclosed herein are by way of illustration in all respects, not by way of limitation. It is intended that the scope of the present invention is defined by claims, not by the above description of the embodiments, and includes all modifications and variations equivalent in meaning and scope to the claims.

The invention claimed is:

1. A charging device for a vehicle, the charging device being configured to charge a power storage device mounted on the vehicle with a power supply outside said vehicle, said vehicle being connectable to said power supply by a coupler that transmits electric power from said power supply to said vehicle, said charging device comprising:

a connector provided to said vehicle and configured such that said coupler is connectable to the connector;

a power feeding unit mounted on said vehicle that transmits said electric power from said connector to said power storage device;

a charging control unit mounted on said vehicle that charges said power storage device by controlling said power feeding unit while the charging control unit is in an operating state, and for halting control of said power feeding unit while the charging control unit is in a halting state;

an activation control unit for keeping said charging control unit in said halting state until it is detected that said electric power is available through said connector in a case where connection of said coupler and said connector is detected, and for switching said charging control unit from said halting state to said operating state when it is detected that said electric power is available through said connector, wherein said coupler transmits a communications signal, which indicates that said electric power is available, to said connector when said coupler and said power supply are connected, and said activation control unit detects that said electric power is available by receiving said communications signal via said connector; and a lighting unit mounted on the vehicle that includes a lamp that can be viewed by a user and that can be illuminated, wherein:

the lighting unit receives a first signal via the connector that indicates that the connector is connected to the coupler, the lighting unit receives a second signal via the activation control unit when the charging control unit is in the operating state that indicates that electric power is available via the connector, the lighting unit determines if the second signal is received within a first predetermined period of time after the first signal is received, the lamp illuminates according to a first pattern that indicates that the connector is connected to the coupler when the lighting unit receives the first signal and then immediately illuminates upon receiving the second signal according to a second pattern that indicates that electric power is available via the connector if the second signal is received after the first predetermined period of time, and the lamp illuminates according to the first pattern when the lighting unit receives the first signal until a second predetermined period of time has elapsed from when the second signal is received and then illuminates according to the second pattern if the second signal is received within the first predetermined period of time.

2. The charging device for a vehicle according to claim 1, wherein said activation control unit halts transmission of said second signal when charging of said power storage device by said charging control unit is completed.

3. The charging device for a vehicle according to claim 1, wherein said first pattern is a lighting pattern to intermittently light up said lamp, and said second pattern is a lighting pattern to continuously light up said lamp.

\* \* \* \* \*